United States Patent [19]

Yamano

[11] Patent Number: 4,836,310

[45] Date of Patent: Jun. 6, 1989

[54] COMBINATION COUNTING AND WEIGHING SYSTEM

[75] Inventor: Shoji Yamano, Akashi, Japan

[73] Assignee: Yamato Scale Company, Limited, Japan

[21] Appl. No.: 204,684

[22] Filed: Jun. 9, 1988

[30] Foreign Application Priority Data

Jul. 3, 1987 [JP] Japan ................................ 62-167546

[51] Int. Cl.⁴ ............................................ G01G 13/00
[52] U.S. Cl. ...................................... 177/25.18; 177/1
[58] Field of Search ................................ 177/1, 25.18

[56] References Cited

U.S. PATENT DOCUMENTS

| | | | |
|---|---|---|---|
| 4,645,019 | 2/1987 | Minamida et al. | 177/1 X |
| 4,645,020 | 2/1987 | Haze | 177/25.18 |
| 4,658,919 | 4/1987 | Nobutsugu | 177/25.18 X |
| 4,658,920 | 4/1987 | Matsumoto et al. | 177/25.18 |

FOREIGN PATENT DOCUMENTS 5548249  9/1976  Japan.
5696331  12/1979  Japan.
57-137820  8/1982  Japan.

Primary Examiner—George H. Miller, Jr.
Attorney, Agent, or Firm—Senniger, Powers, Leavitt and Roedel

[57] ABSTRACT

A combination weighing system for weighing batches of articles and selecting a combination of batches satisfying a condition predetermined for both total weight and number of articles. In the system, the measured weight of each batch is divided by a reference unit weight of the articles and converted into the number of articles which is then rounded into an integral number. This integral number is multiplied by the reference unit weight and restored to the weight of articles. Then, both weights or numbers appearing before and after the rounding operation are mutually weighted and averaged and the resultant weighted averages are subjected to a conventional combination selecting operation.

16 Claims, 6 Drawing Sheets

COMBINATION COUNTING AND WEIGHING SYSTEM

BACKGROUND OF INVENTION

This invention relates to a a combination counting and weighing system for weighing out a predetermined number of articles so as to have a total weight satisfying a predetermined condition.

Various combination counting and weighing systems have been proposed for weighing out a batch of articles having a predetermined number by a combination weigher which is originally adapted for weighing articles in a plurality of weigh units and combining the resultant weight values to obtain a desired total weight. In a system disclosed in Japanese patent publication gazette No. 55-48249, for example, a plurality of articles are weighed in each weigh unit of a combination weigher, the resultant weight value is divided by a reference unit weight of the articles to convert it into the number of articles, such numbers of articles are arithmetically combined to select combinations having a total number satisfying a predetermined condition and, separately, the corresponding weight values are similarly combined to confirm their total weights satisfying a predetermined condition. Although this system can attain the desired objective it is necessary to independently execute separate combination arithmetic operations for the number and weight and this results in a disadvantage in that two similar operation circuits will be needed if both operations are executed in parallel fashion, while the operation time will be doubled if they are executed in series fashion. Japanese utility model opening gazette No. 56-96331 and Japanese patent opening gazette No. 57-137820 disclose systems proposed to remove the above disadvantage. In the former system, the weight values are combined as they are without conversion into number and, separately, a predetermined total number values condition is multiplied by a reference unit weight to covert it into a total weight condition, thereby selecting a combination having a total weight satisfying this condition. In the latter system, the weight value from each weigh unit is converted into the number of articles and then rounded into an integer which is multiplied by the reference unit weight and converted again into the weight of articles. Such converted weight values are arithmetically combined to select a combination having a total weight corresponding to the predetermined number. Although these two improved systems have succeeded in some reduction of the above disadvantage, they do not avoid the problem that an error may occur in either the resultant total weight or number of articles.

In the above-mentioned system of Japanese patent opening gazette No. 57-137820, for example, a target weight W and a target number N are previously set. The weight value from each weigh unit is divided by a reference unit weight W/N for conversion into the number of articles which is then rounded into an integer. The rounded number is then multiplied by the reference unit weight W/N for re-conversion into a weight value. A normal combination operation is executed with such converted weight values, and then combined weight values are compared with the target weight to select an optimum combination. However, the combined weight values in this case generally deviate from the target weight and result in a reduced selection efficiency. This is because the rounding operation results in deviation of the number of articles from its true value when there is an abnormal difference between the average unit weight of articles in a specific weigh unit and the reference unit weight thereof. Therefore, the number of articles of the selected combination is sometimes inconsistent even if its total weight satisfies the condition.

SUMMARY OF INVENTION

Accordingly, an object of this invention is to modify the above-mentioned system of Japanese patent opening gazette No. 57-137820 to provide an improved combination counting and weighing system which can avoid the above-mentioned disadvantage.

A combination counting and weighing device according to this invention includes, the same as the device of Japanese patent opening gazette No. 57-137820, a plurality of weigh units each adapted for weighing a batch of articles, each article having a known reference unit weight, means for dividing the resultant measured weight values by the reference unit weight to calculate the estimated numbers of articles in the respective weigh units, means for rounding the estimated numbers into integral numbers, means for multiplying the integral numbers by the reference unit weight to calculate revised weight values of the respective batches, "means for weighting and averaging the revised weight values and the corresponding measured weight values to arrive at weighted weight values,"; and combination arithmetic means for combining the weighted weight values to select a combination having a total weight equal or close to a target weight.

The weighting and averaging means functions, for example, to multiply one of the measured weight value from each weigh unit and its corresponding revised weight value by a weighting coefficient k, to sum the resultant value with the other weight value and divide the sum by $k+1$ and to supply this result to the combination arithmetic means instead of the revised weight value. The weighting coefficient includes one and, when $k=1$, the input of the combination arithmetic means is an arithmetic mean of the measured weight and the revised weight. This weighted average avoids the adverse effect of the rounding operation, as described later.

It is readily understood in this system that the same effect is obtained when the sum of both weight values is supplied as it is without division by $k+1$ and the comparison is effected with the target weight multiplied by $k+1$, instead. It should also be evident to those skilled in the art that a similar operation is successfully effected with respect to the numbers of articles before and after the rounding operation, instead of the weight values.

In this system, the combination arithmetic operation is applied to only one of the weight and number. Therefore, only one circuit is needed therefor and the time therefor is never doubled.

These and other objects and features of this invention will be described in more detail below with reference to the accompanying drawings.

BRIEF DESCRIPTION OF DRAWINGS

In the drawings.

Throughout the drawings, the same reference numerals are given to the same structural components.

DESCRIPTION OF PREFERRED EMBODIMENTS

Figure 1:
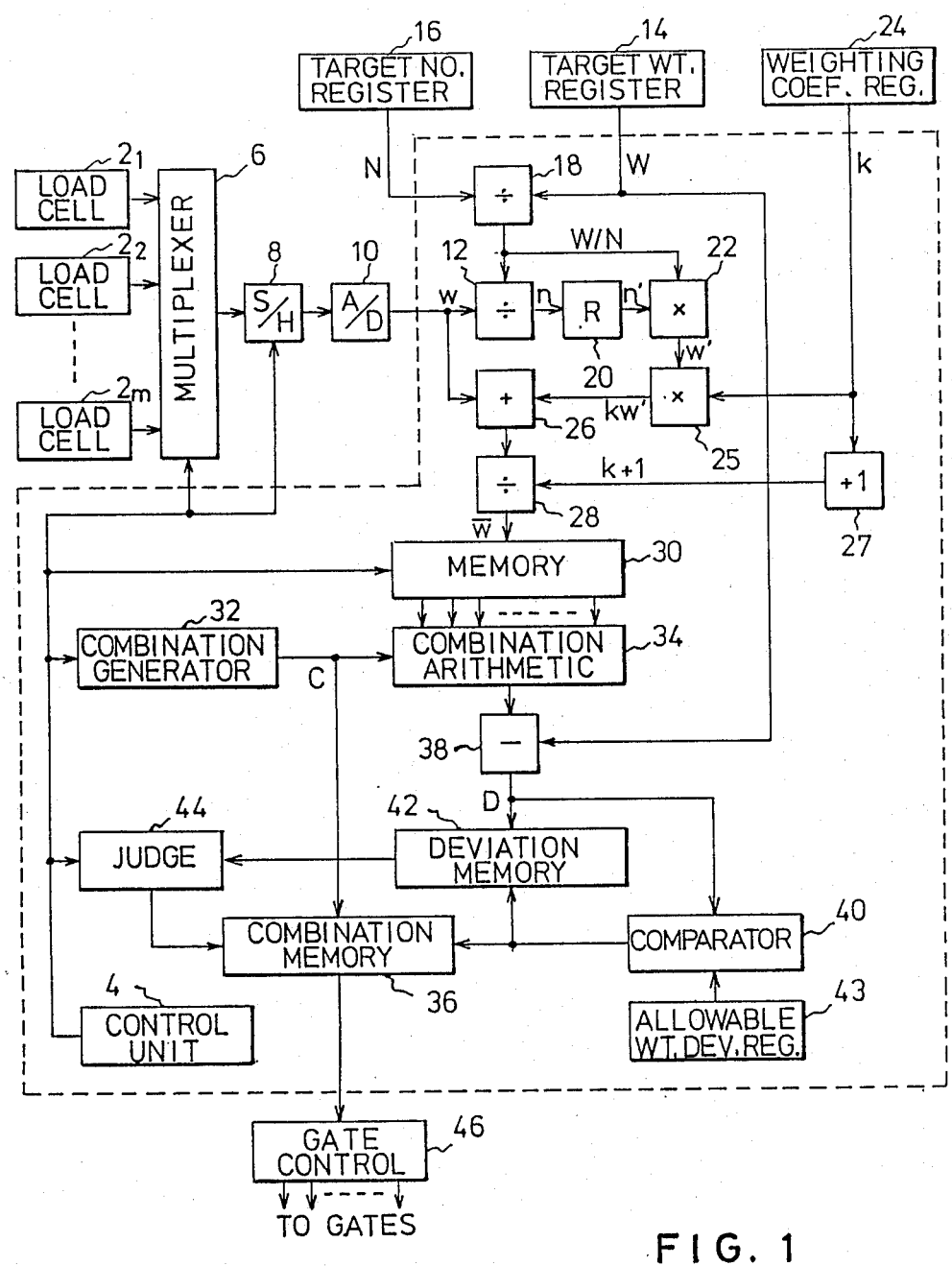
FIG. 1 is a block diagram representing an embodiment of the combination counting and weighing system according to this invention.

Referring to FIG. 1, analog weight signals from weight sensors such as load cells $2_1, 2_2, \ldots 2_m$ attached to respective weigh hoppers of a plurality of weigh units of a combination weigher are supplied through a multiplexer 6 controlled by a control unit 4 in time division fashion to a sample-and-hold circuit 8 and temporarily held therein. The sample-and-hold circuit 8 is also controlled by the control unit 4 to successively supply the analog weight signals to an analog-to-digital (A/D) convertor 10 in which they are converted into digital weight signals $w_i$ (i=1,2, ... m). The digital weight signals $w_i$ are sequentially supplied to a divider 12 and divided here by a reference unit weight to become values $n_i$ (i=1,2, ... m) representing the numbers of articles. The reference unit weight is obtained by dividing a target weight W preset in a target weight register 14 by a target number of articles N preset in a target number register 16 in the divider 18. The output of divider 12 is rounded off its fraction in a rounding circuit 20 into an integral value $n_i'$. The value $n_i'$ is supplied to a multiplier 22 and multiplied here by the reference unit weight from divider 18 to return to a weight signal $w_i'$. According to this invention, this output of multiplier 22 is subjected to a weighting operation before a combination operation, while it was directly subjected to the combination operation in the above-mentioned system of Japanese patent opening gazette No. 57-137820.

More particularly, the output $w_i'$ of multiplier 22 is multiplied in a succeeding multiplier 25 by a weighting coefficient k preset in a weighting coefficient register 24 and then summed in an adder 26 with the output $w_i$ of A/D convertor 10. The sum output of adder 26 is divided in a divider 28 by the output k+1 of a one (+1) adder 27 to become a weighted average $\overline{w}_i$. When the weighting coefficient k equals to one (k=1), the weighted average $\overline{w}_i$ is an arithmetic mean of $w_i$ and $w_i'$, that is, $(w_i+w_i')/2$. However, it moves from the arithmetic mean towards the output $w_i'$ of multiplier 22 when k becomes greater than one. This effect is inverted when, instead of the output $w_i'$ of multiplier 22, the output $w_i$ of A/D convertor 10 is weighted.

The weighted averages $\overline{w}_i$ are successively stored in a memory 30 under control of control unit 4 and then supplied to a combination arithmetic unit 34. The combination arithmetic unit 34 combines $\overline{w}_i$ in accordance with combinations generated by a combination generator 32 and calculates respective total weight values, the same as in the prior art. The combination generator 32 may be composed, for example, of an m-bit binary counter as described in the above-mentioned references, which generates $2^m-1$ combination patterns and supplies them to the combination arithmetic unit 34 and a combination memory 36.

The combination weight outputs of combination arithmetic unit 34 are successively supplied to a subtracter 38 which subtracts from each combination weight value the target weight W from target weight register 14 to provide a deviation signal which is then supplied to a comparator 40 and a deviation memory 42. The comparator 40 compares it with an allowable weight deviation preset in an allowable deviation register 43 and, when it is less than the latter, supplies a command signal to deviation memory 42 and combination memory 36 to cause them to store their current input signals. Accordingly, the memory 42 stores all deviations falling within the allowable range and the memory 36 stores all the corresponding combination patterns when the arithmetic operations for all combinations have finished. Upon completion of all combination operations, a judge unit 44 responds to a signal from control unit 4 to select the minimum deviation including zero from the deviations in memory 42 and commands the combination memory 36 to cause it to supply a combination pattern corresponding to the minimum deviation to a gate control unit 46. The gate control unit 46 sends signals to driving units for the discharge gates of those weigh hoppers corresponding to this combination pattern to cause them to open these gates for delivery of the contents of these hoppers. No further description will be made on the content of such combination selection and discharge operation since it is well known in the art.

Figure 2:
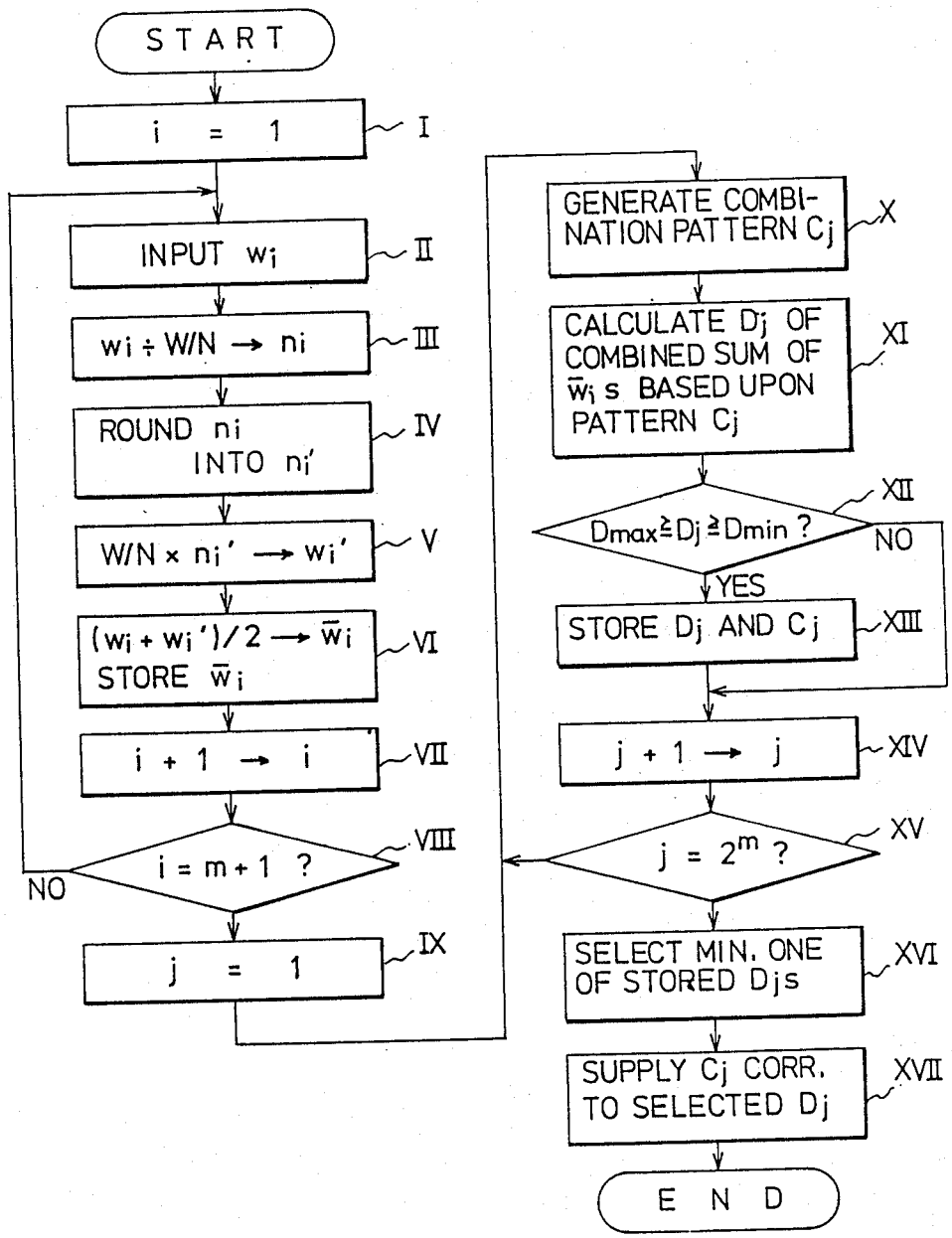
FIG. 2 is a flow chart representing an operation program for a computerized embodiment of FIG. 1.

The operation of the circuit portion surrounded by dashed lines in FIG. 1 can be executed by a microcomputer and this is rather convenient in practice. Now, the description will be made on a program executed by the microcomputer in the case of a weighting coefficient equal to one (k=1) with reference to FIG. 2. It is assumed that the microcomputer includes an m-bit binary counter and generates thereby $2^m-1$ combination patterns.

First, an i-counter included in the microcomputer for specifying a weigh unit is set to count one (step I). Then, the multiplexer 6 and sample-and-hold circuit 8 are controlled to convert a weight signal from the first weight sensor $2_1$ into a digital weight signal $w_1$ by A/D convertor 10 and input it to the microcomputer (step II). Next, the weight $w_1$ is divided by the reference unit weight W/N to be converted into the number of articles $n_1$ (having a fraction) (step III) and then rounded into an integral value $n_1'$ (step IV). This value $n_1'$ represents the number of articles whose weight is sensed by sensor $2_1$. Then, this number is multiplied by the reference unit weight W/N to be converted again into a weight value $w_1$, (step V) and an arithmetic mean of the wieght values $w_1$ and $w_1$, is calculated and stored (step VI). Then, the count of i-counter is advanced by one (here it is made two) (step VII) and it is inquired whether i is equal to m+1 or not (step VIII). If i has not yet exceeded the total number mof the weigh units and the answer is NO, the program returns to step II and the same operation is repeated to successively advance the i-counter in step VII). When the count iexceedm, the program advances to a next step IX. At this time, m-number of $w_i$ (i=1,2, ... m) are stored in the memory included in the microcomputer.

In step IX, a j-counter included in the microcomputer for counting identification numbers j of the generated $2^m-1$ combination patterns is set to count one, and then the first combination pattern $C_1$ is generated (step X). A combination operation for $\overline{w}_i$ is effected as described above with this combination pattern and a deviation $D_1$ of the total weight from the target weight W is calculated (step XI). This deviation $D_1$ is then compared with preset upper and lower limits $D_{max}$ and $D_{min}$ of the allowable range (step XII). If the deviation $D_1$ is within this range, the deviation $D_1$ and the corresponding combination pattern $C_1$ are stored (step XIII) but, if not, the program jumps to step XIV to advance the j-counter by one count (here, it is made two). Then, it is inquired whether the count of j-counter has exceeded the total number $2^m-1$ of the combination patterns, or whether j has reached $2^m$ or not (step XV) and, if NO, the program returns to step X to repeat the same operation. When the above-mentioned operation has been effected for all combination patterns and j has reached $2^m$, zero or one nearest thereto is selected from the stored deviations (step XVI) and a signal indicative of the combination pattern corresponding to the selected deviation is supplied to the above-mentioned gate control unit 46 (step XVII).

Figure 3:
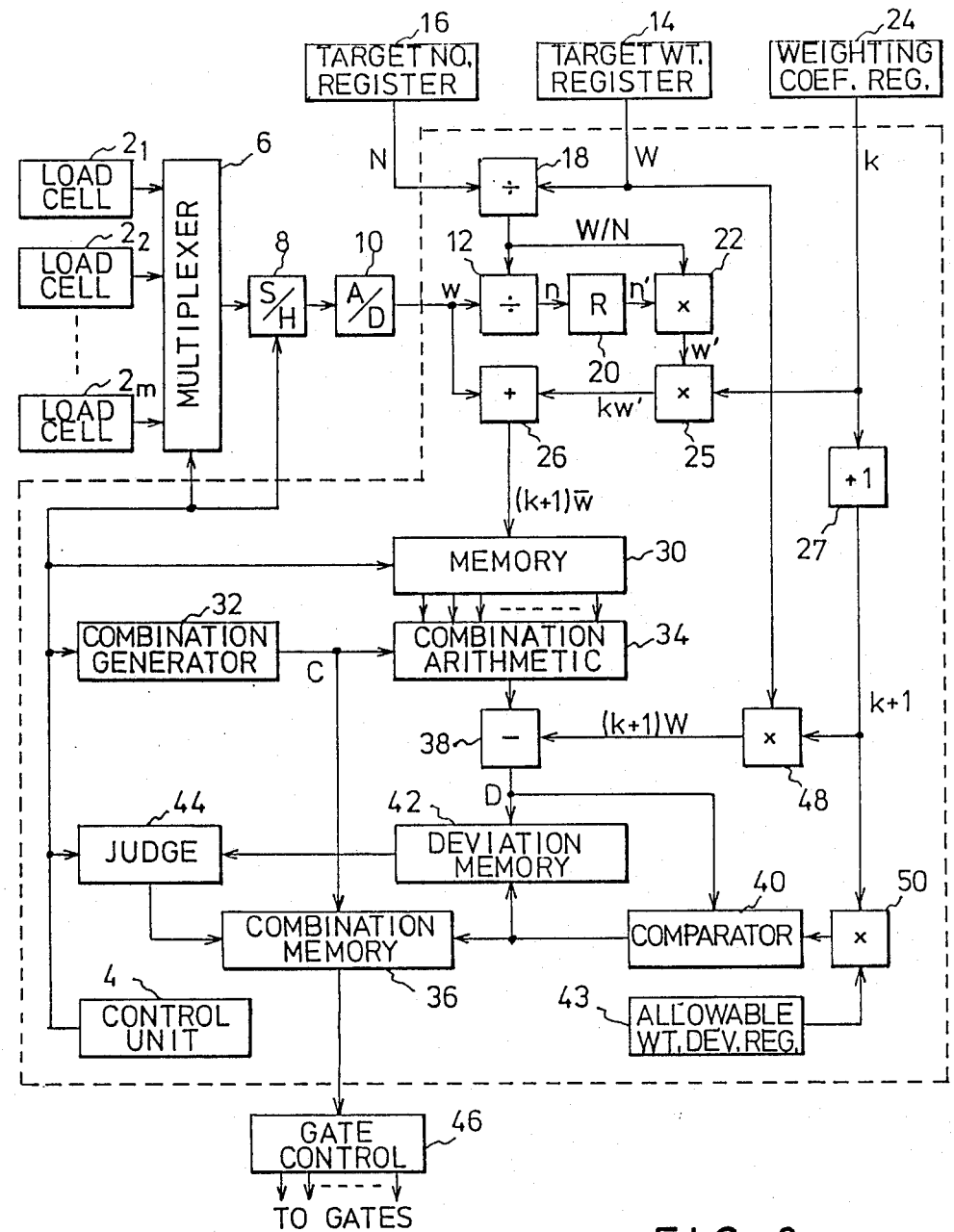
FIG. 3 is a block diagram representing a modification of the embodiment of FIG. 1.

While the weighted averages $\overline{w}_i$ of weight values are subjected to combination operation in the embodiment of FIG. 1, the output values of adder 26 of FIG. 1, that is $(k+1) w_i (i=1,2, \ldots m)$ may be subjected thereto. It is evident, in this case, that the subtracter 38 must calculate the deviations with resepct to $k+1$ times the target weight W, not the target weight W itself, and that the comparator 40 must effect the comparison with $k+1$ times the allowable deviation. Accordingly, a circuit arrangement for effecting this operation is as shown in FIG. 3. As readily understood from the drawings, it is substantially the same as the circuit arrangement of FIG. 1 except that the divider 28 is removed and multipliers 48 and 50 are added for multiplication of the coefficient $k+1$.

While the target weight W and the target number N are preset in the embodiments of FIGS. 1 and 3, the target weight W and the reference unit weight W/N may be preset. In this case, the elements 16 and 18 are combined into a reference unit weight register.

Figure 4:
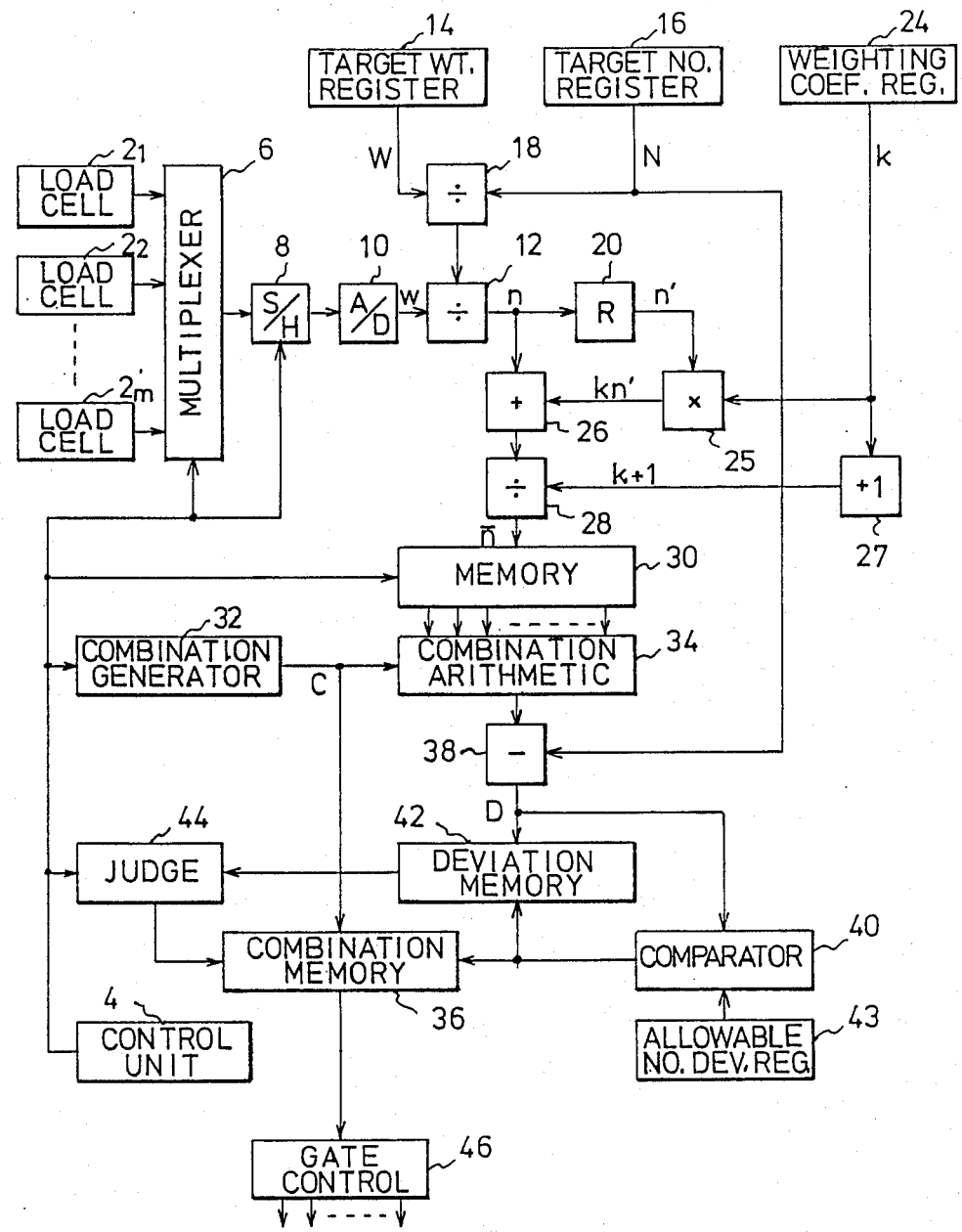
FIG. 4 is a block diagram representing another embodiment of the combination counting and weighing system according to this invention.
Figure 5:
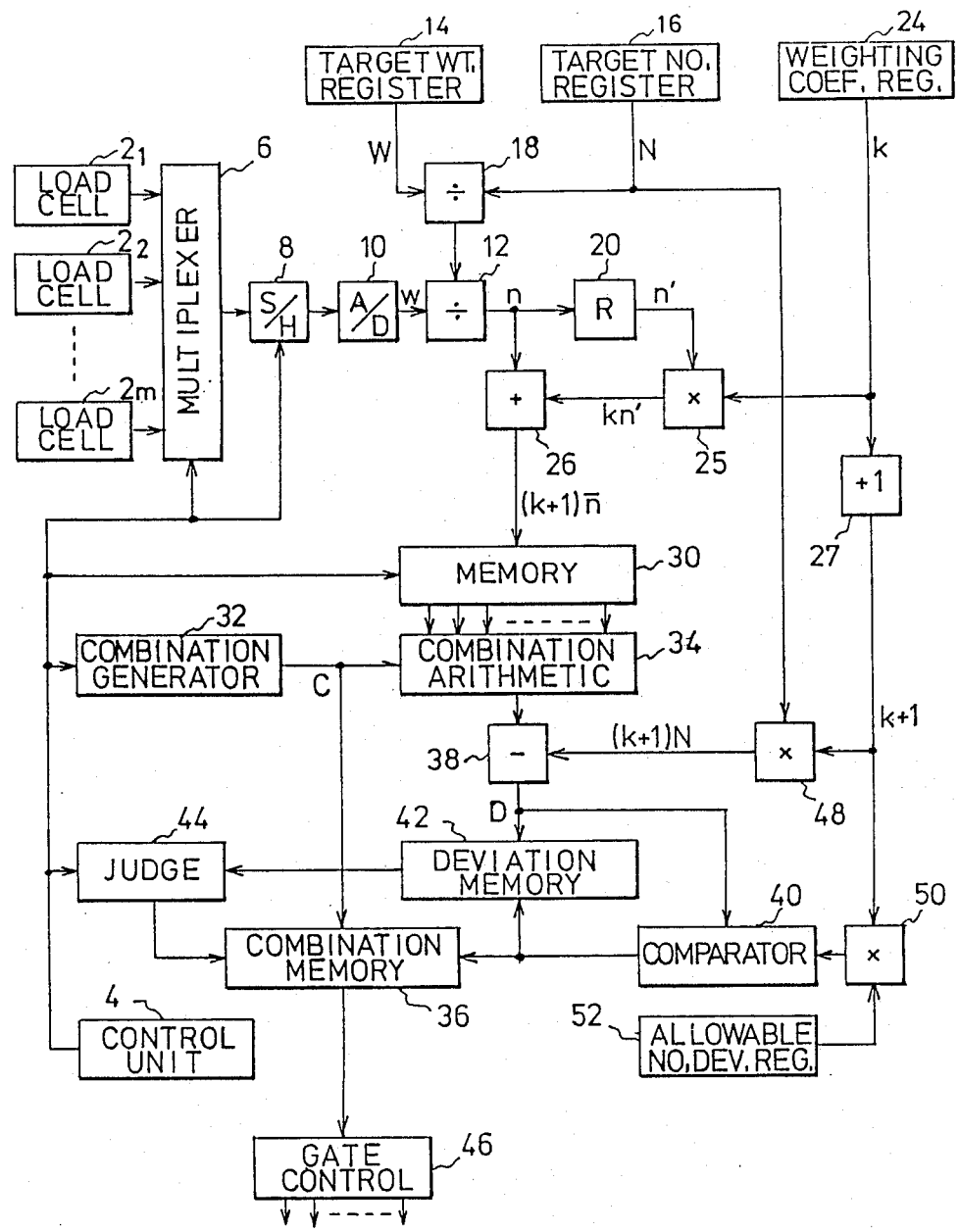
FIG. 5 is a block diagram representing a modification of the embodiment of FIG. 4, which corresponds to that of FIG. 3.

While the combination operation is effected in a weight preference mode in the above embodiments, it may be effected in number preference mode. FIGS. 4 and 5 show preferable circuit arrangements used in this case. The arrangement of FIG. 4 corresponds to the arrangement of FIG. 1 and the arrangement of FIG. 5 corresponds to the arrangement of FIG. 3. More specifically, it will be understood from comparison of the arrangements of FIGS. 1 and 3 with the arrangement of FIGS. 4 and 5 that the latter arrangements include no multiplier 22, and that the multiplier 25 and the adder 26 execute weighting and summing operations of the input and output values $n_i$ and $n_i'$ of rounding circuit 20, and that the calculation of the deviation in subtracter 38 is effected with respect to the target number N or $(k+1)$ and the comparison in comparator 40 is effected also with a number deviation value from an allowable number deviation register 52 or $(k+1)$ times the value. The arrangement of the other components is exactly same. While, in the embodiments of FIGS. 4 and 5, the combination arithmetic operation is effected for weighted averages or weighted sums of the number of articles, its mode of operation is the same as that for weight in the embodiments of FIG. 1 and 3 and will not be described further.

Figure 6:
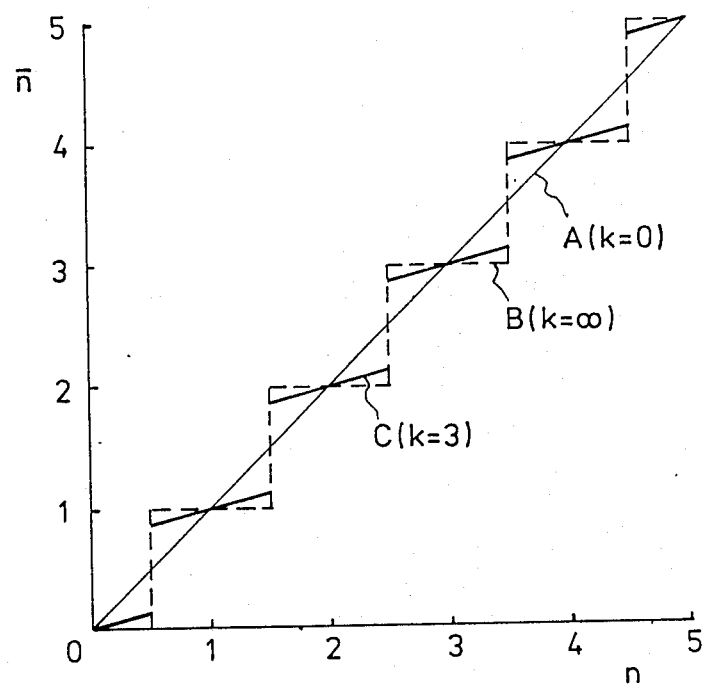
FIG. 6 is a diagram used for explaining an operation effect of the embodiment of FIG. 4.

FIG. 6 shows a diagram representing a relation between the number of articles n with fraction from divider 12 and the weighted average number $\overline{n}$ from divider 28 in the arrangement of FIG. 4. If the weighting coefficient k is zero, then $\overline{n} = n$ and the relation therebetween is given by a straight line A. If k is infinity, then $\overline{n} = n'$ and the relation is given by dashed square steps B. Accordingly, if the value of k is definite and falls between zero and infinity the relation will be given by a slanting straight line (e.g., C) between both straight lines A and B. The line C of FIG. 6 is given when $k=3$. Thus, the disadvantage of the prior art is cancelled since the weighted average of this invention falls between the numbers of articles before and after the rounding operation. While the value of weighting coefficient k is to be suitably selected in accordance with variance of real unit weights of articles to be weighed and the number of articles in each weigh hopper, it has experientially been found that k between 2 and 5 inclusive is generally preferable. It is obvious that this direction is also applicable to the emboidment of FIG. 1.

While the target W and the target number N are preset in the embodiments of FIGS. 4 and 5, the target number N and the reference unit weight W/N may be preset. In this case, the element 14 and 18 are combined into a reference unit weight register. The allowable number deviation register 50 of the embodiments of FIGS. 4 and 5 may be substituted with the allowable weight deviation register 43 of FIGS. 1 and 3 and the output thereof may be divided be the reference unit weight W/N to convert it into an allowable number deviation. Its converse is also possible.

While, in the above embodiments, all the deviations falling within the allowable range and corresponding combination patterns are stored and then the minimum deviation and a corresponding combination pattern are selected therefrom, it is also possible to store a single deviation within the allowable range and a corresponding combination pattern and repeat an operation of updating them with another deviation closer to zero and a corresponding combination pattern. In this case, a combined total value used in place of the deviation may be updated with another total value closer to the target value. Such methods of update mode are disclosed, for example, in U.S. Pat. No. 4,416,341. Although there are many other modifications of optimum combination selecting system, no description will be made thereon since they have no direct combination to this invention.

While the multiplexer 6 in the above embodiments receives weight signals directly from the weight sensors, it may receive them from memories as in the case of a known combination weigher having auxiliary hoppers. Although such known structures of combination weigher and known operation modes such as double shift operation can, of course, be combined with the system of this invention, no further description will be made thereon since they have no direct connection to the invention.

I claim:

1. A combination counting and weighing device for combining batches of articles, each batch including a plurality of articles and each article having a known reference unit weight, to select a combination of batches having a total number of articles and a total wieght equal or close to a predetermined target number and a predetermined target weight, respectively, said device comprising a plurality of weigh units for measuring respective weights of said batches, divider means for dividing the measured weights by said reference unit weight to calculate estimated numbers of articles in said respective batches, means for rounding said estimated numbers of articles to convert them into integral numbers, multiplier means for multiplying said integral numbers by said reference unit weight to calculate revised weights, means for weighting said revised weights with respect to the corresponding measured weights to arrive at weighted weights, and combination arithmetic means for combining said weighted weights to select a combination having a total weight equal or close to said predetermined target weight.

2. A device, as set forth in claim 1, wherein said weighting means includes means for multiplying one of each measured weight and its corresponding revised weight by a weighting coefficient k, dividing a sum of the resultant value and the other of said weights by $k+1$ to arrive at a weighted weight, and supplying said weighted weight to said combination arithmetic means for combination.

3. A device, as set forth in claim 1, wherein said weighting means includes means for multiplying one of each measured weight and its corresponding revised weight by a weighting coefficient k and supplying a sum of the resultant value and the other of said weights to said combination arithmetic means for combination, and means for substituting $k+1$ times said target weight for the target weight of said combination arithmetic means.

4. A device, as set forth in claim 2 or 3, wherein the value of said weighing coefficient k falls between 2 and 5 inclusive.

5. A combination counting and weighing method for combining batches of articles, each batch including a plurality of articles and each article having a known reference unit weight, to select a combination of batches having a total number of articles and a total weight equal or close to a predetermined target number and a predetermined target weight, respectively, comprising the steps of measuring weights of said batches by a plurality of respective weigh units, dividing the respective measured weights by said reference unit weight to calculate estimated numbers of articles in respective batches, rounding said estimated numbers to convert them into integral numbers, multiplying said integral numbers of said reference unit weights to calculate revised weight values, weighting said revised weight values with respect to said measured weights to arrive at weighted weights, and combining said weighted weights to select a combination having a total weight equal or close to said predetermined target weight.

6. A method, as set forth in claim 5, wherein said weighting step includes steps of multiplying one of each measured weight and its corresponding revised weight by a weighting coefficient k, dividing a sum of the resultant value and the other of said weights by $k+1$ to arrive at a weighted weight, and using said weighted weights in said combining step.

7. A method, as set forth in claim 5, wherein said weighting step includes a step for multiplying one of each measured weight and its corresponding revised weight by a weighting coefficient k and using in said combining step a sum of the resultant value and the other of said weights instead of said revised weights, and a step for multiplying said target weight by $k+1$ and using the result in said combining step instead of said target weight.

8. A method, as set forth in claim 6 or 7, wherein the value of said weighting coefficient k falls between 2 and 5 inclusive.

9. A combination counting and weighing device for combining batches of articles, each batch including a plurality of articles and each article having a known reference unit weight, to select a combination of batches having a total number of articles and a total weight equal or close to a predetermined target number and a predetermined target weight, respectively, said device comprising a plurality of weigh units for measuring respective weights of said batches, divider means for dividing the measured weights by said reference unit weight to calculate estimated numbers of articles in respective batches, means for rounding said estimated numbers of articles to convert them into integral numbers, means for weighting said integral numbers with respect to the corresponding estimated numbers to arrive at weighted numbers, and combination arithmetic means for combining said weighted numbers to select a combination having a total number equal or close to said predetermined target number.

10. A device, as set forth in claim 9, wherein said weighting means includes means for multiplying one of each estimated number and its corresponding integral number by a weighting coefficient k, dividing a sum of the resultant value and the other of said numbers by $k+1$ to arrive at a weighted number, and supplying said weighted number to said combination arithmetic means for combination.

11. A device, as set forth in claim 9, wherein said weighting means includes means for multiplying one of each estimated number and its corresponding integral number by a weighting coefficient k and supplying a sum of the resultant value and the other of said numbers to said combination arithmetic means for combination instead of said integral number, and means for substituting $k+1$ times said target number for the target number of said combination arithmetic means.

12. A device, as set forth in claim 10 or 11, wherein the value of said weighting coefficient k falls between 2 and 5 inclusive.

13. A combination counting and weighing method for combining batches of articles, each batch including a plurality of articles and each article having a known reference unit weight, to select a combination of batches having a total number of articles and a total weight equal or close to a predetermined target number and a predetermined target weight, respectively, comprising the steps of measuring weights of said batches by a plurality of respective weigh units, dividing the respective measured weights by said reference unit weight to calculate estimated numbers of articles in respective batches, rounding said estimated numbers to convert them into integral numbers, weighting said integral numbers with respect to said estimate numbers to arrive at weighted numbers, and combining said weighted numbers to select a combination having a total number equal or close to said predetermined target number.

14. A method, as set forth in claim 13, wherein said weighting step includes steps of multiplying one of each estimated number and its corresponding integral number by a weighting coefficient k, dividing a sum of the resultant value and the other of said numbers by k+1 and using said weighted numbers in said combining step.

15. A method, as set forth in claim 13, wherein said weighting step includes a step for multiplying one of said estimated number and its corresponding integral number by a weighting coefficient k and using in said combination step a sum of the resultant value and the other of said numbers instead of said revised weights, and a step for multiplying said target number by k+1 and using the result in said combining step instead of said target number.

16. A method, as set forth in claim 14 or 15, wherein the value of said weighting coefficient k falls between 2 and 5 inclusive.

* * * * *